(12) United States Patent
Van Phan et al.

(10) Patent No.: US 10,728,795 B2
(45) Date of Patent: Jul. 28, 2020

(54) IMPROVING COMMUNICATION EFFICIENCY

(71) Applicant: NOKIA SOLUTIONS AND NETWORKS OY, Espoo (FI)

(72) Inventors: Vinh Van Phan, Oulu (FI); Samuli Heikki Turtinen, Ii (FI); Timo Koskela, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 15/760,099

(22) PCT Filed: Oct. 21, 2015

(86) PCT No.: PCT/EP2015/074391
§ 371 (c)(1),
(2) Date: Mar. 14, 2018

(87) PCT Pub. No.: WO2017/067595
PCT Pub. Date: Apr. 27, 2017

(65) Prior Publication Data
US 2018/0262949 A1 Sep. 13, 2018

(51) Int. Cl.
*H04W 28/04* (2009.01)
*H04L 1/18* (2006.01)
*H04W 28/06* (2009.01)

(52) U.S. Cl.
CPC ............ *H04W 28/04* (2013.01); *H04L 1/188* (2013.01); *H04L 1/189* (2013.01); *H04L 1/1812* (2013.01); *H04L 1/1819* (2013.01); *H04L 1/1825* (2013.01); *H04L 1/1887* (2013.01); *H04L 1/1896* (2013.01); *H04W 28/06* (2013.01)

(58) Field of Classification Search
CPC .... H04W 28/04; H04W 28/06; H04L 1/1812; H04L 1/1819; H04L 1/1825; H04L 1/188; H04L 1/1887; H04L 1/189; H04L 1/1896
USPC .......................................................... 370/216
See application file for complete search history.

(56) References Cited

U.S. PATENT DOCUMENTS

| 7,145,889 | B1 | 12/2006 | Hashem et al. | |
| 8,675,568 | B2 * | 3/2014 | Pelletier | H04W 52/0225 370/328 |
| 9,954,643 | B2 * | 4/2018 | El-Khamy | H04L 1/1845 |
| 2006/0200722 | A1 * | 9/2006 | Braun | H04L 1/0007 714/748 |

(Continued)

OTHER PUBLICATIONS

International Search Report and Written Opinion for International Application No. PCT/EP2015/074391, dated Jul. 11, 2016 (9 pages).

*Primary Examiner* — Yemane Mesfin
*Assistant Examiner* — Intekhaab A Siddiquee
(74) *Attorney, Agent, or Firm* — Brake Hughes Bellermann LLP

(57) ABSTRACT

There is provided a method comprising: determining, by a first network node of a cellular communication network, that a transfer of a data block to a second network node of the cellular communication network needs a retransmission; determining whether at least one criterion for a size and/or latency requirements of said data block is met; and as a response to determining that the at least one criterion is met, performing the retransmission according to a first set of rules, otherwise performing the retransmission according to a second set of rules.

22 Claims, 9 Drawing Sheets

(56) References Cited

U.S. PATENT DOCUMENTS

2009/0175369 A1* 7/2009 Atarashi ............... H04L 1/0003
375/260

* cited by examiner

210 DETERMINING, BY A FIRST NETWORK NODE, THAT A TRANSFER OF A DATA BLOCK TO A SECOND NETWORK NODE NEEDS A RETRANSMISSION

220 DETERMINING WHETHER AT LEAST ONE CRITERION FOR A SIZE AND/OR LATENCY REQUIREMENTS OF SAID DATA BLOCK IS MET

230 AS A RESPONSE TO DETERMINING THAT THE AT LEAST ONE CRITERION IS MET, PERFORMING THE RETRANSMISSION ACCORDING TO A FIRST SET OF RULES, OTHERWISE PERFORMING THE RETRANSMISSION ACCORDING TO A SECOND SET OF RULES.

Fig. 2

310 DETERMINING, BY A SECOND NETWORK NODE, THAT A TRANSFER OF A DATA BLOCK FROM A FIRST NETWORK NODE TO THE SECOND NETWORK NODE NEEDS A RETRANSMISSION

320 TRANSMITTING A MESSAGE TO THE FIRST NETWORK NODE, WHEREIN SAID MESSAGE INDICATES THE NEED FOR THE RETRANSMISSION

330 DETERMINING WHETHER AT LEAST ONE CRITERION FOR A SIZE AND/OR LATENCY REQUIREMENTS OF SAID DATA BLOCK IS MET

340 IF THE AT LEAST ONE CRITERION IS MET, EXPECTING THE RETRANSMISSION ACCORDING TO A FIRST SET OF RULES, OTHERWISE EXPECTING THE RETRANSMISSION ACCORDING TO A SECOND SET OF RULES

Fig. 3

IMPROVING COMMUNICATION EFFICIENCY

CROSS-REFERENCE TO RELATED APPLICATIONS

This application is a national stage entry of PCT Application No. PCT/EP2015/074391 filed Oct. 21, 2015, entitled "IMPROVING COMMUNICATION EFFICIENCY" which is hereby incorporated by reference in its entirety.

TECHNICAL FIELD

The invention relates to communications.

BACKGROUND

In a communication network, data may be transferred between network elements and terminal devices. It may be beneficial to provide solutions to enhance robustness and/or probability of data block transfer from a transmitter to a receiver.

BRIEF DESCRIPTION

According to an aspect, there is provided the subject matter of the independent claims. Some embodiments are defined in the dependent claims.

According to an aspect, there is provided a method comprising: determining, by a second network node of a cellular communication network, that a transfer of a data block from a first network node of the cellular communication network to the second network node needs a retransmission; transmitting a message to the first network node, wherein said message indicates the need for the retransmission; determining whether at least one criterion for a size and/or latency requirements of said data block is met; if the at least one criterion is met, configuring reception of the retransmission according to a first set of rules, otherwise configuring reception of the retransmission according to a second set of rules.

In an embodiment, the configuring the reception of the retransmission according to the first set of rules comprises enabling reception of a message of the retransmission comprising a version of said data block, and either a copy of said version or another version of said data block.

In an embodiment, the configuring the reception of the retransmission according to the first set of rules comprises enabling the reception of the message of the retransmission comprising said data block divided into a plurality of segments.

In an embodiment, the configuring the reception of the retransmission according to the first set of rules comprises enabling the reception of the message of the retransmission further comprising a copy of at least one segment of the plurality of segments, or at least one segment of said another version of said data block.

In an embodiment, the configuring the reception of the retransmission according to the first set of rules comprises enabling the reception of the retransmission within a transmission time interval, or within said transmission time interval and at least one other transmission time interval being subsequent to said transmission time interval.

In an embodiment, the configuring the reception of the retransmission according to the second set of rules comprises enabling the reception of the message of the retransmission comprising only one version of said data block.

One or more examples of implementations are set forth in more detail in the accompanying drawings and the description below. Other features will be apparent from the description and drawings, and from the claims.

BRIEF DESCRIPTION OF DRAWINGS

In the following embodiments will be described in greater detail with reference to the attached drawings, in which
FIG. 2 illustrates a flow diagram according to an embodiment of the invention;
FIG. 3 illustrates a flow diagram according to an embodiment of the invention.

DETAILED DESCRIPTION OF SOME EMBODIMENTS

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Embodiments described may be implemented in a radio system, such as in at least one of the following: Worldwide Interoperability for Micro-wave Access (WiMAX), Global System for Mobile communications (GSM, 2G), GSM EDGE radio access Network (GERAN), General Packet Radio Service (GRPS), Universal Mobile Telecommunication System (UMTS, 3G) based on basic wideband-code division multiple access (W-CDMA), high-speed packet access (HSPA), Long Term Evolution (LTE), and/or LTE-Advanced.

The embodiments are not, however, restricted to the system given as an example but a person skilled in the art may apply the solution to other communication systems provided with necessary properties. Another example of a suitable communications system is the 5G concept. 5G is likely to use multiple input—multiple output (MIMO) techniques (e.g. antennas), many more base stations or nodes than the LTE (a so-called small cell concept), including macro sites operating in co-operation with smaller stations and perhaps also employing a variety of radio technologies for better coverage and enhanced data rates. 5G will likely be comprised of more than one radio access technology (RAT), each optimized for certain use cases and/or spectrum. 5G mobile communications will have a wider range of use cases and related applications including video streaming, augmented reality, different ways of data sharing and various forms of machine type applications, including vehicular safety, different sensors and real-time control. 5G is expected to have multiple radio interfaces, namely below 6 GHz, cmWave and mmWave, and also being integradable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz—cmWave, below 6 GHz—cmWave—mmWave). One of the concepts considered to be used in 5G networks is network slicing in which multiple independent and dedicated virtual sub-networks (network instances) may be created within the same infrastructure to run services that have different requirements on latency, reliability, throughput and mobility.

Figure 1A:
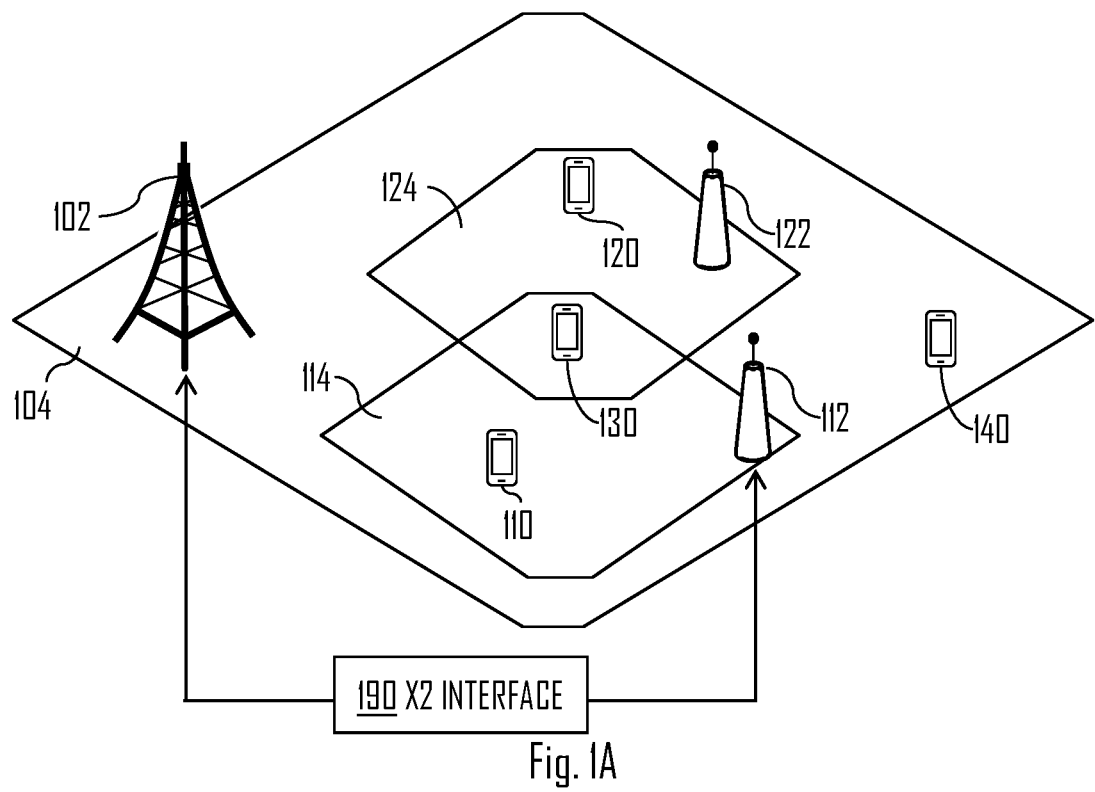
FIG. 1A illustrates an example a radio system to which embodiments of the invention may be applied.

FIG. 1A illustrates example of a radio system (also referred to as a cellular communication system) to which embodiments of the invention may be applied. Radio communication networks (also referred to as cellular communication networks), such as the Long Term Evolution (LTE), the LTE-Advanced (LTE-A) of the $3^{rd}$ Generation Partnership Project (3GPP), or the predicted future 5G solutions, are typically composed of at least one network element, such as a network element 102, providing a cell 104. In the example of FIG. 1, cells 104, 114, 124 may be shown. The cell 114 may be provided by a network element 112, and the cell 124 may be provided by a network element 122, for example. The cell 104 may be provided by the network element 102. It is, however, possible that a network element of the radio system may provide more than one cell. Thus, for example, the network element 102 may provide the cell 104, the cell 114, and/or the cell 124.

Each cell of the radio communication network may be, e.g., a macro cell, a micro cell, a femto, or a pico-cell, for example. Each of the network elements of the radio communication network, such as the network elements 102, 112, 122, may be an evolved Node B (eNB) as in the LTE and LTE-A, a radio network controller (RNC) as in the UMTS, a base station controller (BSC) as in the GSM/GERAN, or any other apparatus capable of controlling radio communication and managing radio resources within a cell. For 5G solutions, the implementation may be similar to LTE-A, as described above. The network elements 102, 112, 122 may be base station(s) or a small base station(s), for example. In the case of multiple eNBs in the communication network, the eNBs may be connected to each other with an X2 interface 190 as specified in the LTE. Example of this may be shown in FIG. 1, wherein the network element 112 may be shown to be connected to the network element 102 via the X2 interface 190. Other communication methods between the network elements may also be possible. At least some of the network elements 102, 112, 122 may be further connected via an S1 interface to an evolved packet core, more specifically to a mobility management entity (MME) and to a system architecture evolution gateway (SAE-GW).

The cells 114, 124 may also be referred to as sub-cells or local area cells, for example. The network elements 112, 122 may be referred to as sub-network elements or local area access nodes, for example. The cell 104 may be referred also to as a macro cell, for example. The network element 102 may be referred to as a macro network element, for example. In an embodiment, the local area access nodes are network elements similar to the network element 102. Thus, for example, the local area access node 112 may be an eNB or a macro eNB.

The cells 104, 114, 124 may provide service for at least one terminal device 110, 120, 130, 140, wherein the at least one terminal device 110, 120, 130, 140 may be located within or comprised in at least one of the cells 104, 114, 124.

The at least one terminal device 110, 120, 130, 140 may communicate with the network elements 102, 112, 122 using communication link(s), which may be understood as communication link(s) for end-to-end communication, wherein source device transmits data to the destination device. It needs to be understood that the cells 104, 114, 124 may provide service for a certain area, and thus the at least one terminal device 110, 120, 130, 140 may need to be within said area in order to be able to use said service. For example, a third terminal device 130 may be able to use service provided by the cells 104, 114, 124. On the other hand, fourth terminal device 140 may be able to use only service of the cell 104, for example.

The cells 104, 114, 124 may be at least partially overlapping with each other. Thus, the at least one terminal device 110, 120, 130, 140 may be enable to use service of more than one cell at a time. For example, the sub-cells 114, 124 may be small cells that are associated with the macro cell 104. This may mean that the network element 102 (e.g. macro network element 102) may at least partially control the network elements 112, 122 (e.g. local area access nodes). For example, the macro network element 102 may cause the local area access nodes 112, 122 to transmit data to the at least one terminal device 110, 120, 130, 140. It may also be possible to receive data, by the network element 102, from the at least one terminal device 110, 120, 130, 140 via the network elements 112, 122. To further explain the scenario, the cells 114, 124 may be at least partially within the cell 104.

In an embodiment, the at least one terminal device 110, 120, 130, 140 is able to communicate with other similar devices via the network element 102 and/or the local area access nodes 112, 122. For example, a first terminal device 110 may transmit data via the network element 102 to a third terminal device 130. The other devices may be within the cell 104 and/or may be within other cells provided by other network elements. The at least one terminal device 110, 120, 130, 140 may be stationary or on the move. In an embodiment, the at least one terminal device 110, 120, 130, 140 may communicate directly with other terminal devices using, for example, Device-to-Device (D2D) communication.

The radio system may support Carrier Aggregation (CA). CA may enable increasing usable bandwidth between the terminal devices and network elements of the radio system. For example, in the 3GPP, CA may be used for LTE-A in order to support wider transmission bandwidths enhancing increased potential peak data rates to meet LTE-A requirements. For example, more than one component carriers may be aggregated contiguously and/or non-contiguously to provide a wider bandwidth. In uplink carrier aggregation, multiple uplink component carriers may be aggregated and can be allocated in a subframe to a terminal device. Further, the radio system may support intra-band CA with contiguous and/or non-contiguous resource allocation. The radio system may also support inter-band CA enabling non-contiguous resource allocation from more than one radio band.

The radio system may support Dual Connectivity (DC). This may be enabled by the network element 102 and a second network element (e.g. the local area access nodes(s) 112, 122), for example. Naturally, in order to use DC, the at least one terminal device 110, 120, 130, 140 may also need to support DC. The DC may be a radio system feature, wherein the at least one terminal device 110, 120, 130, 140 may simultaneously receive from and/or may simultaneously transmit to at least two network points. Similarly, the radio system of FIG. 1A may support Multiple-Input and Multiple-Output (MIMO). Thus, the network elements and/or the terminal devices of the radio system may comprise more than one antenna for data transfer. For example, the network element 102 may be a primary network element (e.g. Primary eNB) providing a Primary Cell (PCell) and at least one of the local area access nodes 112, 122 may be a secondary network element (e.g. Secondary eNB) and/or a primary secondary network element (e.g. Primary Secondary eNB) providing a Secondary Cell (SCell) and/or Primary Secondary Cell (PSCell).

It may be possible that the radio system shown in FIG. 1A supports Licensed-Assisted Access (LAA) which relates to using unlicensed radio band(s) for data transfer. For example, the network element 102 and/or the second network element may provide one or more unlicensed cells in order to increase data transfer capability on the radio system. For example, the network element 102 may allocate radio resources of the one or more unlicensed cell for the at least one terminal device 110, 120, 130, 140 through CA, thus increasing the data transfer between the at least one terminal device 110, 120, 130, 140 and the network element(s).

It may also be possible that the radio system of FIG. 1A supports Machine Type Communication (MTC). MTC may enable providing service for a large amount of MTC capable devices. Such communication may increase the load of the radio communication network and thus solutions to enhance such communication may be beneficial.

The at least one terminal device 110, 120, 130, 140 may comprise mobile phones, smart phones, tablet computers, laptops and other devices used for user communication with the radio communication network. These devices may provide further functionality compared to the MTC schema, such as communication link for voice, video and/or data transfer. However, it needs to be understood that the at least one terminal device 110, 120, 130, 140 may also comprise MTC capable devices, such as sensor devices providing position, acceleration and/or temperature information to name a few examples. That said the radio communication network of FIG. 1A may comprise different types of devices (e.g. phones, laptops, tablets, MTC devices) and communication methods (e.g. CA, DC). The amount of devices and data transfer requirements may increase burden of the radio communication network. The Internet of Things (IoT) may even further increase the amount of devices within the radio communication network.

Figure 1B:
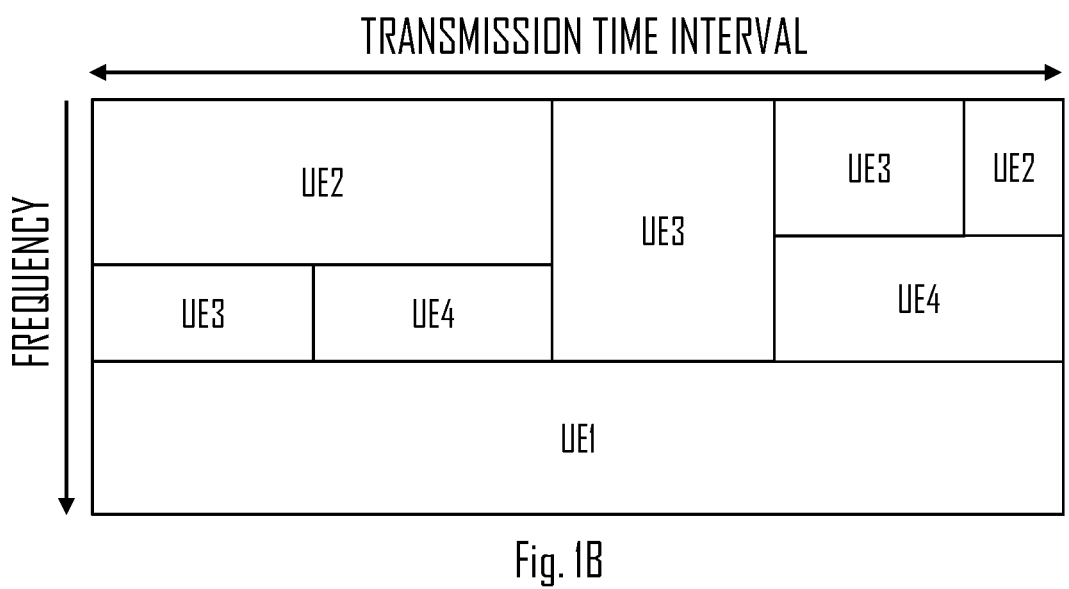
FIG. 1B illustrates an example of radio resource allocation in the radio system of FIG. 1A.

FIG. 1B illustrates an example of radio resource allocation in the example radio system of FIG. 1A. Referring to FIG. 1B, a dynamic resource allocation on Transmission Time interval (TTI) level may be shown. TTI may be dynamically configured such that TTI length may, for example, be N time domain symbols. For example, TTI may be 1, 2, or 7 time domain symbols, such as Orthogonal Frequency-Division Multiplexing (OFDM) or Single-Carrier-Frequency-Division Multiple Access (SC-FDMA) symbols. TTI may also be configured to be some other number of time domain symbols. Within one TTI, as shown in FIG. 1B, radio resources may be allocated to different terminal devices (UE1, UE2, UE3, and UE4). For example, for UE1 the allocation may comprise bandwidth for the duration of said TTI. On the other hand, the allocation may be less than the duration of the TTI. The bandwidth allocated may, for example, comprise one or more Physical Resource Blocks (PRBs) and/or one or more frequency bins for some duration within the TTI. Naturally, it is also possible to allocate radio resources within some other TTIs. Thus, it may also be possible to dynamically allocate resources within the dynamically adjustable TTI.

High data rate, high reliability, and low latency requirements of future radio systems, such as 5G, may impose challenges to system design. For example, to achieve 1 ms radio latency with 0.2 ms TTI, it may not be beneficial to allow many retransmission attempts. That is, a data block (also referred to as data packet) would be beneficial to be put through over the air interface, from a transmitter to a receiver, with minimum amount of transmission attempts (e.g. one or two transmission attempts). Furthermore, with a peak data rate of over 10 Gbps, a data block with 0.2 ms TTI may have a size of over 2 Mb or 250 kB and a failed transmission of such a super-size data block would be beneficial to be avoided. In an embodiment, the data block comprises and/or is a Transport Block (TB).

There is provided a solution to enhance the transmission scheme of a transport block, such as a TB, from a transmitter to a receiver. The solution may be utilized for downlink (DL) and/or uplink (UL) data transfers. The proposed solution may be used as an enhanced Hybrid Automatic Repeat Request (HARQ) scheme in which retransmission is adapted to data block size and/or latency requirements.

FIG. 2 illustrates a flow diagram of an embodiment of the invention. Referring to FIG. 2, in step 210, a first network node of a cellular communication network may determine that a transfer of a data block to a second network node of the cellular communication network needs a retransmission. In step 220, the first network node may determine whether at least one criterion for a size and/or latency requirements of said data block is met. In step 230, as a response to determining that the at least one criterion is met, the first network node may perform the retransmission according to a first set of rules, otherwise the first network node may perform the retransmission according to a second set of rules (i.e. in a case where the at least one criterion is not met).

The first network node performing the steps 210 to 230 of FIG. 2 may be and/or be comprised in the network element 102, the local area access node(s) 112, 122, and/or in the at least one terminal device 110, 120, 130, 140, for example. Further, an apparatus (e.g. circuitry) integrated with a network node may perform the steps of FIG. 2. Similarly, the second network node may be and/or comprised in the network element 102, the local area access node(s) 112, 122, and/or in the at least one terminal device 110, 120, 130, 140, for example.

FIG. 3 illustrates a flow diagram of an embodiment of the invention. Referring to FIG. 3, in step 310, a second network node of a cellular communication network may determine that a transfer of a data block from a first network node of the cellular communication network to the second network node needs a retransmission. In step 320, the second network node may transmit a message to the first network node, wherein said message indicates the need for the retransmission. In step 330, the second network node may determine whether at least one criterion for a size and/or latency requirements of said data block is met. In step 340, the second network node may configure reception of the retransmission according to a first set of rules if the at least one criterion is met, otherwise the second network node may configure reception of the retransmission according to a second set of rules.

The second network node performing the steps 310 to 340 of FIG. 3 may be and/or be comprised in the network element 102, the local area access node(s) 112, 122, and/or in the at least one terminal device 110, 120, 130, 140, for example. Further, an apparatus (e.g. circuitry) integrated with a network node may perform the steps of FIG. 3. Similarly, the first network node may be and/or comprised in the network element 102, the local area access node(s) 112, 122, and/or in the at least one terminal device 110, 120, 130, 140, for example.

Let us now look closer on some embodiments of the proposed solution. It needs to be noted that, as explained above, the proposed solution may be utilized both in UL and/or DL data transfer. Due to simplicity reasons, let us first look at the proposed solution from DL perspective as shown in FIGS. 4A to 4B, wherein the network element 102, such as an eNB, transmits or at least tries to transmit data to the terminal device 110.

Figure 4A:
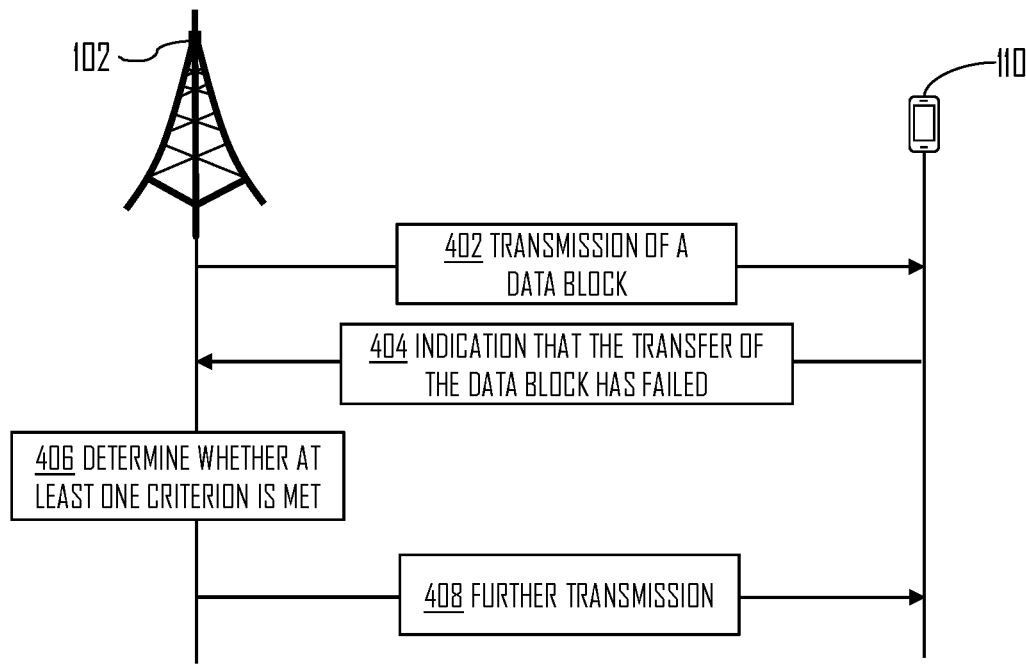
FIGS. 4A to 4B illustrate some embodiments.
Figure 4B:
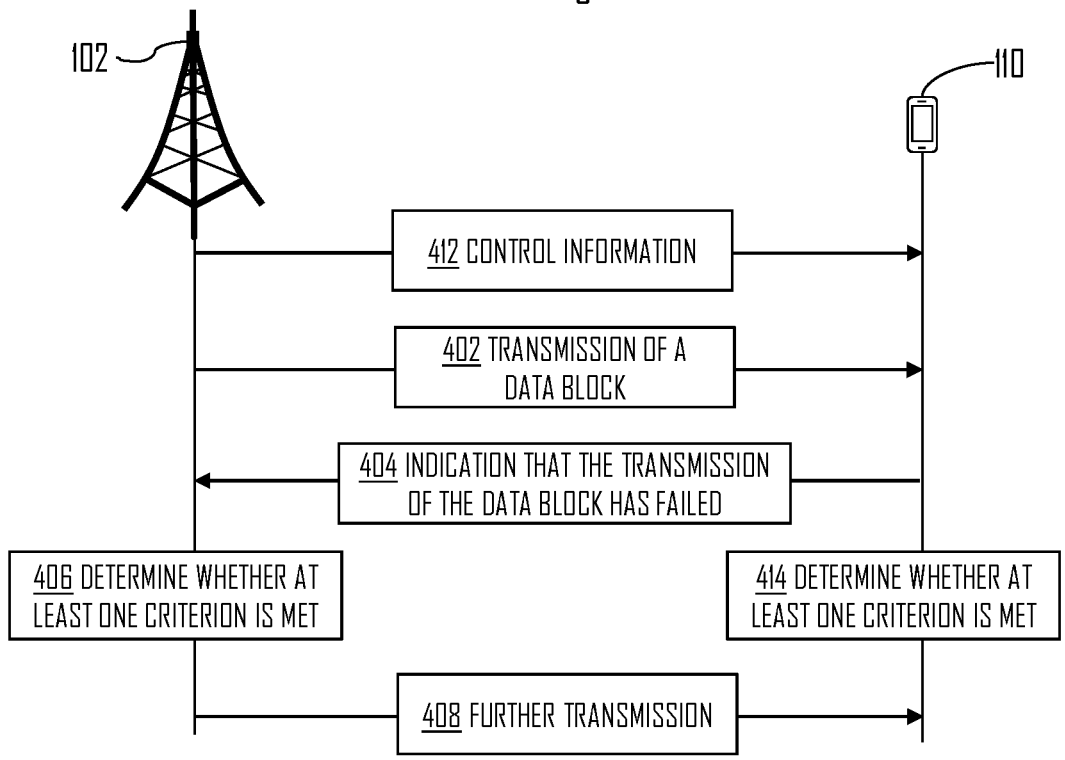

Referring to FIG. 4A, the network element 102 may perform transmission of a data block to the terminal device 110 (block 402). The terminal device 110 may determine that the data block has not been received correctly (i.e. transfer of the data block has failed), and indicate that the transfer of the data block has failed to the network element 102 (block 404). For example, there may be interference which causes the data block to be only partially received by the terminal device 110, or the data block may not be received at all. E.g. the radio channel in between may be temporarily blocked causing the reception to fail. The indication (block 404) may indicate which parts of the data block were not received by the terminal device 110. For example, the indication may indicate that the data block was not received at all, some part is missing, or that some parts were not received. Thus, the network element 102 may become aware of which data of the data block was not receive by the terminal device 110.

In block 406, the network element 102 may determine whether the at least one criterion with respect to size and/or latency requirements of the data block (i.e. the data block that is tried to successfully be transmitted) are met. In some embodiments, the block 406 may precede the blocks 404 and/or 402. For example, the at least one criterion may comprise a first criterion for data block size and/or a second criterion for data block latency requirements, wherein the determining whether the at least one criterion is met comprises at least one of the following steps: determining whether the size of said data block meets the first criterion; and determining whether the latency requirements of said data block meet the second criterion. These different criterions are discussed later in more detail in relation to FIGS. 7A to 7B.

In block 408, the network element 102 may perform the further transmission according to the first set of rules or second set of rules based on the determination in block 406. In an embodiment, the network element 102 performs the further transmission according to the first set of rules if the first criterion is met (e.g. data block size related criterion). In an embodiment, the network element 102 performs the further transmission according to the first set of rules if the second criterion is met (e.g. data block latency requirements related criterion). In an embodiment, the network element 102 performs the further transmission according to the first set of rules if both the first and second criterions are. Otherwise (i.e. when the transmission is not performed according to the first set of rules) the transmission may be performed according to the second set of rules. The further transmission of block 408 may comprise performing a retransmission of at least some data of the data block. The retransmission and its contents may be discussed with greater detail with reference to FIGS. 6A to 6E. The further transmission of step 408 may be a first retransmission or a subsequent retransmission. Thus, the transmission of step 402 may be an initial transmission of the data block or a retransmission.

In FIG. 4B, same blocks and/or steps (blocks 402-408), may be shown as in FIG. 4A with additional blocks 412 and 414. Referring to FIG. 4B, the network element 102 and/or some other network element may transmit a control message to the terminal device 110, wherein the control message comprises indication of the at least one criterion in order to enable terminal device to expect the retransmission according to at least one of the first set of rules, the second set of rules (block 412). The terminal device 110 may receive the control message from the network element 102 and/or from some other network element, wherein the control message comprises indication of the at least one criterion. It needs to be understood that the control information of block 412 may be transmitted at some point to the terminal device 110. The transmission may comprise broadcasting (e.g. for a group of terminal devices) and/or dedicated signaling. In one example, the control information is transmitted after or on cell reselection. In one example, the control information is transmitted after or on when receiving a request to connect to the network by the terminal device 110. In any case, the terminal device 110 may become aware about the at least one criterion. Further, the control information may comprise indication about form of the retransmission according to first set of rules and/or second set of rules. Thus, the receiver (in this case the terminal device 110) may become aware in which form the retransmission is transmitted (e.g. segmented data block(s), two copies of the data block).

In an embodiment, the at least one criterion is preconfigured to the terminal device 110. Thus, the configuration information may not necessarily have to be transmitted as in block 412.

In block 414, the terminal device 110 may determine whether the at least one criterion is met. This step may correspond to that of block 330 of FIG. 3. Consequently, the terminal device 110 may then configure the reception such that the further transmission of block 408 may be received from the network element 102.

Figure 5:
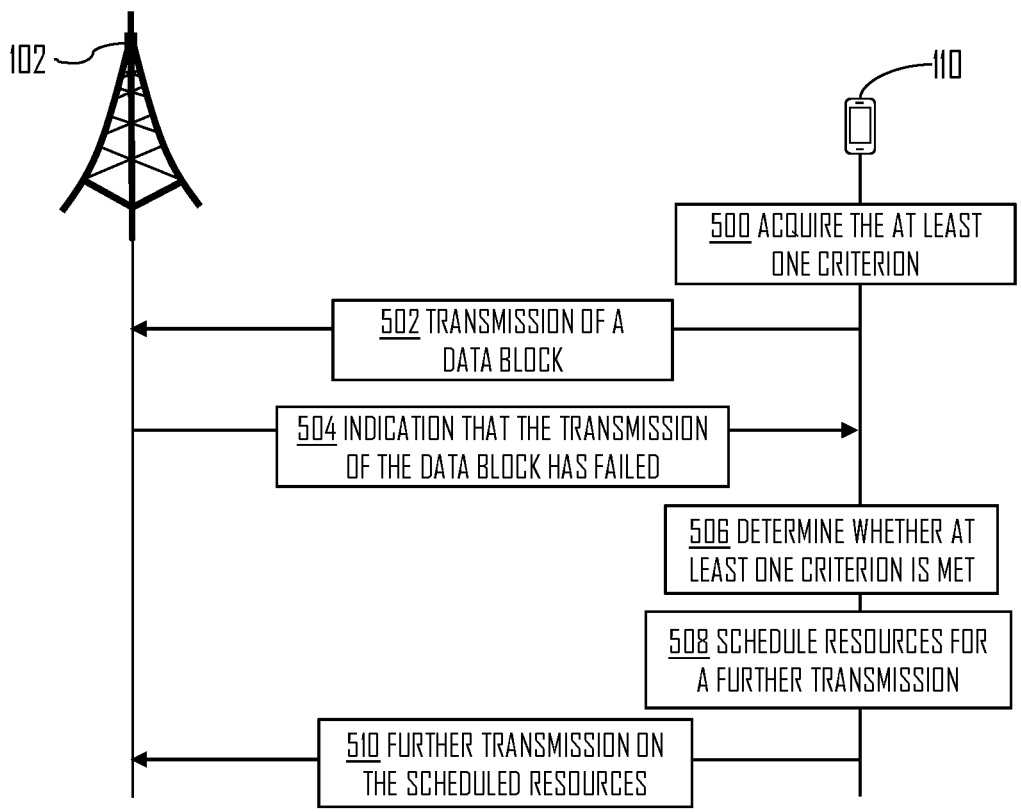
FIG. 5 illustrates an embodiment.

Let us now look the proposed solution from the terminal device 110 perspective as shown in an embodiment of FIG. 5. As indicated in FIG. 2, the terminal device 110 may also perform the proposed solution. Thus, the terminal device 110 may transmit a data block to the network element 102 (block 502). The network element 102 may transmit an indication that the transfer of the data block has failed and/or that retransmission is needed (block 504). The terminal device 110 may then determine whether the at least one criterion is met (block 506), and perform a further transmission to the network element 102 (block 510).

In an embodiment, the first network node performing the steps of FIG. 2 is a terminal device, such as the terminal device 110, and wherein the retransmission (e.g. retransmission of block 230) is an uplink retransmission.

In an embodiment, the terminal device 110 acquires the at least one criterion from the cellular communication network (block 500). For example, the network element 102 and/or some other network element may transmit a configuration message comprising the at least one criterion to the terminal device 110. It needs to be noted that the at least one criterion may be used both in the receiving and transmitting side. Thus, the cellular communication network may indicate the at least one criterion to the terminal device 110 such that the terminal device 110 may utilize the at least one criterion when transmitting and/or receiving data (e.g. data block(s) and/or version(s) of data block(s)).

In an embodiment, the terminal device 110 acquires, from the cellular communication network, an indication specifying the content of the message of the retransmission according to the first set of rules. The retransmission may be an uplink retransmission, for example. The content of the message may refer to the form of the message, and thus the actual data that is comprised in the message may be decided by the terminal device 110 transmitting the message. That is, the content of the message may determine, for example, whether there are two versions of the data block, or whether the data block version is to be segmented.

The indication specifying the content of the message of the retransmission according to the first set of rules may be utilized in the transmitting and/or receiving end. For example, it may be possible that the network element 102 and/or some other network element indicates both the at least one criterion and the content of the message of the retransmission according to the first set of rules in block 500. The configuration information received and/or transferred may be transferred via Physical Downlink Control Channel (PDCCH), for example. That is, PDCCH may be used to transfer control information form the cellular communication network to the terminal devices.

In an embodiment, with reference to FIG. 5, the terminal device 110 schedules radio resources for the uplink retransmission according to the first set of rules or the second set of rules (block 508), and performs the uplink retransmission using said scheduled radio resources (block 510).

The scheduling of step 508 may comprise, for example, that the network element 102 transmits an indication of a radio resource pool to the terminal device 110. The terminal device 110 may receive the indication, and schedule the radio resources for the transmission of block 510 from the indicated radio resource pool. In an embodiment, the terminal device 110 indicates to the network element 102 the scheduled radio resources before transmitting of block 510.

Another option may be that the network element 102 indicates a plurality of radio resources options (e.g. three different resource allocations) to the terminal device 110, wherein the terminal device 110 may select one or more of the indicated options, and use the selected options for the transmission of block 510. The terminal device 110 may indicate to the network element 102 which radio resource option(s) it has selected before the transmitting of block 510.

It may also be possible that the network element 102 and/or some other network element schedules the radio resources for the terminal device 110. This may require the cellular communication network (e.g. the network element 102) to indicate, to the terminal device, the radio resources to be used for the retransmission.

Figure 6A:
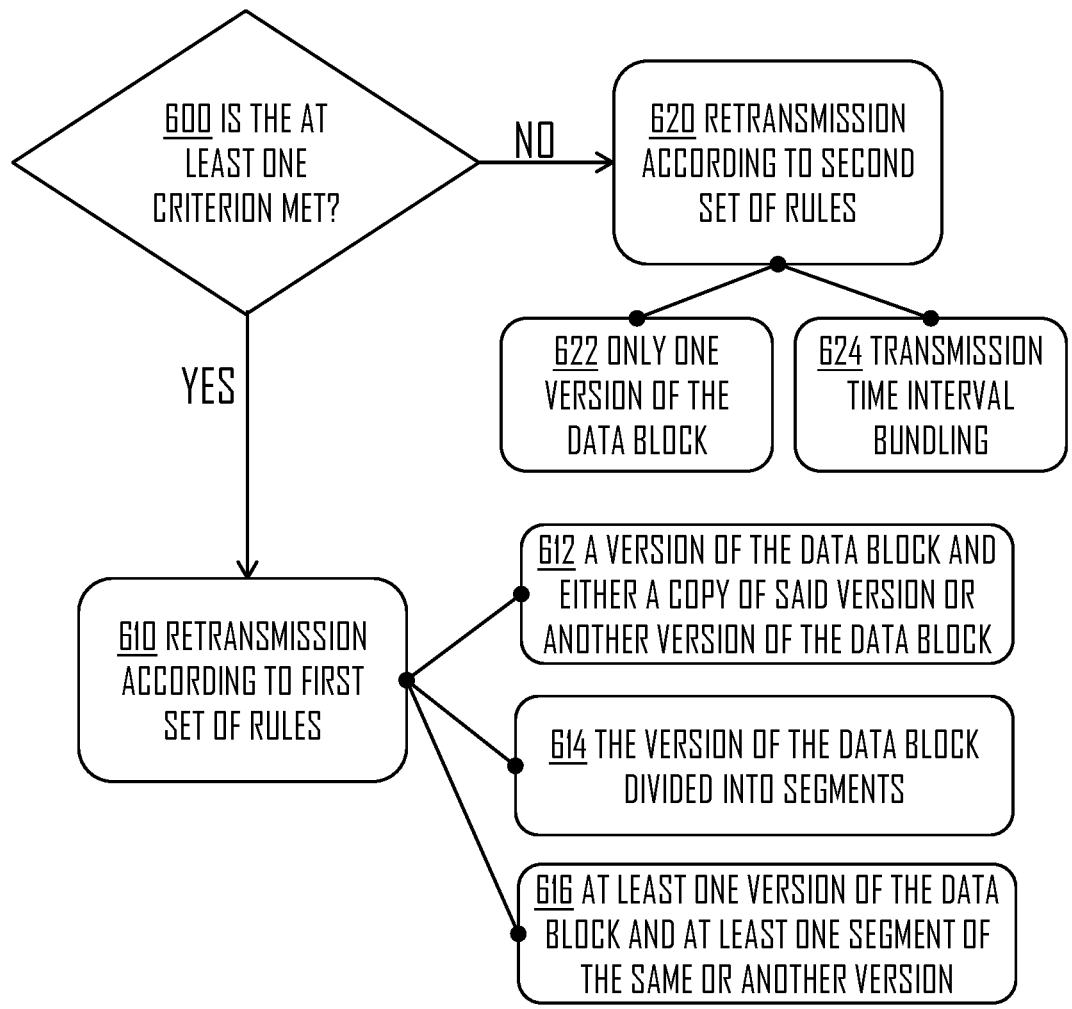
FIGS. 6A to 6E illustrate some embodiments.

Let us now take a look to the first and second set of rules which were discussed shortly above with reference to an embodiment of FIG. 6A. A network node of the cellular communication network, such as the network element 102, local area access node 112, and/or the terminal device 110, may determine whether the at least one criterion met in order to determine whether the retransmission should be performed according to the first or second set or rules (block 600). Based on the determining whether the at least one criterion is met, the network node may proceed to block 610 (i.e. if the at least one criterion is met), or to block 620 (i.e. if the at least one criterion is not met). The retransmission according to the first and/or second set of rules may comprise transmitting a message of retransmission, by the transmitter, to the receiver. However, the contents of the message of retransmission may depend on the rules and/or may vary also within the rules. For example, the message may be different also within the first set of rules. Let us first take a look on the retransmission according to the first set of rules (block 610).

In an embodiment, the message of retransmission according to the first set of rules comprises a version of the data block, and either a copy of said version or another version of said data block (block 612). The data block may be the data block which transmission was failed, and the retransmission was determined to be needed (e.g. block 210). Therefore, the probability of successful retransmission may be higher, as the message of the retransmission comprises at least two versions of the data block. That is, a first version, and either a copy of the first version or a second version of the same data block. In an embodiment, the message comprises at least three versions, wherein the versions are copies or different versions of the same data block.

Figure 6B:
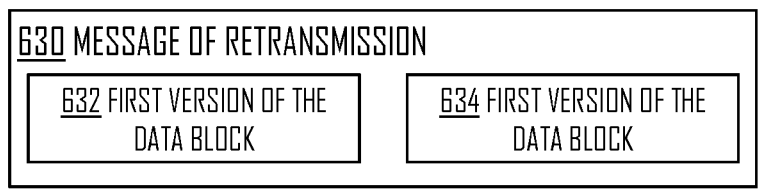

One example of the message of the retransmission according to the block 612 is shown in FIG. 6B, wherein the message of the retransmission 630 may comprise a first version of the data block 632 and a copy of the first version of the data block 634.

Figure 6C:
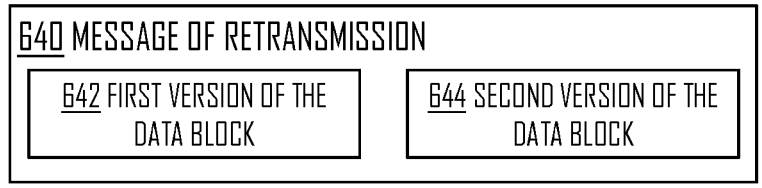

Another example of the message of the retransmission according to the block 612 is shown in FIG. 6C, wherein the message of the retransmission 640 may comprise the first version of the data block 642 and a second version of the data block 644.

In an embodiment, the version means redundancy version of the data block. That is, the versions of the data blocks may be referred to as redundancy version of the data block, for example. There may be one or more redundancy version of the data block, and the transmitter (e.g. the network node) may select one which is comprised in the retransmission. As said this selected redundancy version may be copied, or the message of the retransmission may comprise another redundancy version of the same data block.

In an embodiment, a version of the data block is a copy, a self-decodable, or a combinable redundancy version of the data block.

One and/or any version of the data block may, for example, comprise a portion of data of the original data block. Thus, the version may not necessarily be a full copy of the data block. However, the version may also be a full copy of the data block. The version may, for example, comprise data which is determined not to be transferred correctly. For example, when a data block comprises three subsets, the receiver may indicate that two of the three subsets were received. Thus, the transmitter may, for example, generate the message of the retransmission such that it comprises a first version and a copy of the first version, wherein the first version comprises the missing subset of the data block.

In an embodiment, the first set of rules causes the network node (e.g. the network element 102, terminal device 110) to divide the version of the data block into a plurality of segments, wherein the message of the retransmission according to the first set of rules comprises the plurality of segments (block 614). That is, the message of the retransmission may be transmitted in a plurality of segments meaning that the version is first segmented and then transmitted in smaller blocks compared with original version. For example, the version of the data block may be segmented into three subsets, wherein the subsets are transmitted to the receiver. Thus, the message of the retransmission may be understood to comprise one or more sub-messages being transmitted individually. The segmenting of the version of the data block may provide for a more robust transmission, as the segments may be, for example, transmitted in different frequency areas. To enhance this effect, at least one of the segments may be copied such that the frequency diversity may be enhanced. For example, copies of the same segment may be transmitted, with the message of the retransmission, on different edge areas of the used radio band.

Figure 6D:
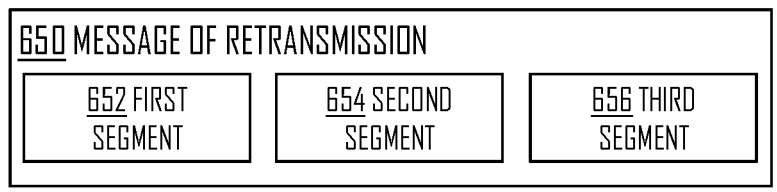

One example of the message of the retransmission according to the block 614 is shown in FIG. 6D, wherein the message of the retransmission 650 may comprise a first, second and third segments 652, 654, 656 of a version of the data block. That is, the version of the data block is divided into three segments 652, 654, 656 in the example of FIG. 6D.

In an embodiment, the message of the retransmission according to the first set of rules comprises at least one version of the data block, and at least one segment of the same or different version of the data block (block 616). That is, the message of the retransmission may comprise, for example, one redundancy version of the data block in full, and at least one segment of the same or another redundancy version. This way, for example, probability of critical information getting to the receiver may be enhanced. Also, as the other version or the copy of the other version is not transmitted in full (e.g. a segment of the same or the other version), radio resources may be saved. In a way, the step described in relation to block 616 may be understood as combining the blocks 612 and 614.

Figure 6E:
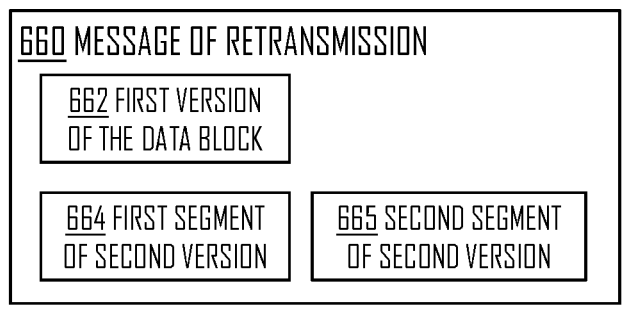

One example of the message of the retransmission according to the block 616 is shown in FIG. 6E, wherein the message of the retransmission 660 may comprise a first version of the data block 662, and at least one segment of a second version of the data block (e.g. first and second segments 665, 665).

In an embodiment, the message of the retransmission comprises the first version of the data block 662, and further at least one segment of the first version and at least one segment of another version of the data block.

In an embodiment, the message of the retransmission according to the first set of rules comprises plurality of segments of a first data block, and a copy of at least one segment of said plurality of segments, or at least one segment of another version of said data block. That is, it may be possible to transmit the version of the data block in segments, and further add, to the transmitted message, a copy of one of the segments or at least one segment of another version of the data block.

Still referring to FIG. 6A, the retransmission according to the second set of rules (block 620) may comprise transmitting only one version of the data block (block 622), or transmission time interval bundling (block 624). This may mean that when the at least one criterion is met (e.g. data block size is under a threshold), the message of the retransmission may comprise, for example, only one version (e.g. a redundancy version) of the data block.

Figure 6F:
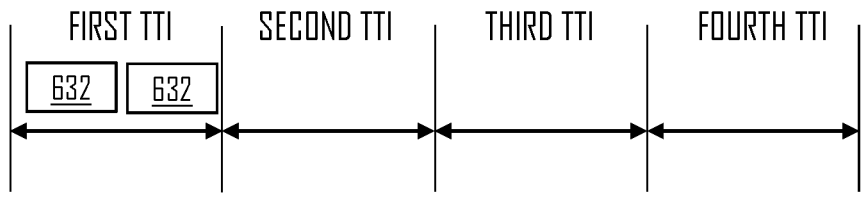
FIGS. 6F to 6H illustrate some embodiments.
Figure 6G:
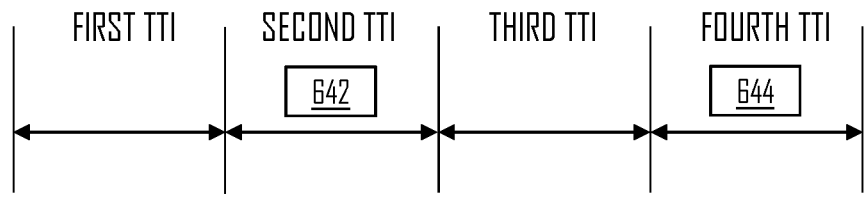

Let us then look closer on when the transmission of the message of the retransmission may happen with reference to examples of FIGS. 6F to 6G. In the examples of FIGS. 6F to 6G, four consecutive TTIs are shown. Naturally, there may be less and/or more than four consecutive TTIs, but the four TTIs are shown as an example.

In an embodiment, the retransmission according to the first set of rules is performed within a transmission time interval, or within said transmission time interval and at least one other transmission time interval being subsequent to said transmission time interval. It may be possible that that Frequency Division Multiplexing (FDM) and/or Space-Division Multiplexing (SDM) separated radio resources are used within the same TTI and/or some two or more TTIs.

In an embodiment, the subsequent at least one other transmission time interval is non-consecutive to said transmission time interval and within the latency requirements of said data block. This may mean that, for example, if there are two TTIs in which the retransmission is performed, there may be one or more TTIs (not utilized in the transmission) between said two TTIs.

Let us first look the case wherein the retransmission is performed within one TTI as shown in FIG. 6F. For example, the first version of the data block 632, and a copy of the first version 632 may be transmitted within the first TTI. Similarly, the plurality of segments and/or some other version of the data block may be transmitted within the same TTI. That is, for example, the transmission messages 630, 640, 650, 660 may be transmitted within the same TTI.

Referring to example of FIG. 6G, the first version 642 may be transmitted within a second TTI, and the second version 644 may be transmitted within a fourth TTI. That is, the message of the transmission may be transmitted within, for example, two TTIs that are not necessarily consecutive to each other, as there may be one or more TTIs between them (e.g. a third TTI as in FIG. 6G).

Figure 6H:
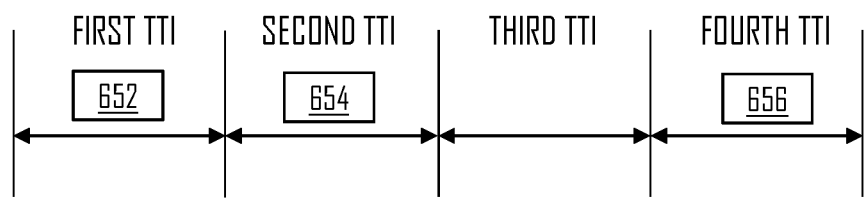

Referring to example of FIG. 6H, the first to three segments 652, 654, 656 of a version of the data block may be transmitted such that the first segment 652 is transmitted within the first TTI, the second segment 654 is transmitted within the second TTI, and the third segment 656 is transmitted within the fourth TTI. Naturally, it may be possible that one or more segments are transmitted within one TTI, and some other segment(s) are transmitted in some other TTIs. For example, the first and second segments 652, 654 may be transmitted within the second TTI, and the third segment 656 may be transmitted within the third TTI.

In an embodiment, the configuring the reception, by the second network node of FIG. 3, comprises enabling reception of the retransmission over non-consecutive transmission time intervals, the method further comprising: transmitting, to the first network node of FIG. 3, an indication for each of the non-consecutive transmission time intervals whether the reception during the transmission time interval is successful or not. That is, the receiver (e.g. the second network node) may indicate for each TTI (e.g. first to fourth TTIs) whether the reception during a TTI is successful or not.

For example, in the example of FIG. 6H, the receiver may indicate whether the transmission during non-consecutive TTI was received successfully or not. That is, the receiver may indicate whether the first segment 652 and second segment 654 were received or not, and whether the third segment 656 was received or not. Thus, for example, two Acknowledgement/Negative-Acknowledgement (ACK/NACK) messages may be transmitted by the second network node, as the first and second TTIs are consecutive, but the fourth TTI is not consecutive to the first and second TTIs.

In an embodiment, the second network node transmits an indication for each TTI whether the reception during the TTI is successful or not. Thus, the indication may be transmitted also for each consecutive TTI.

In an embodiment, the second network node transmits the indication for each of the non-consecutive TTIs, when the message of the retransmission comprises one or more segments of the version of the data block. That is, if the version is transmitted in two or more segments, and indication concerning each segment may be transmitted. This may apply also for cases where the segments are transmitted within one TTI. For example, if two segments are transmitted within the first TTI, the receiver may ACK/NACK both segments. On the other hand, if the message of the retransmission comprises full version of the data block (e.g. not segmented), ACK for only one of the versions may be enough. Naturally, if the one of the versions is not received (i.e. NACK is transmitted), another ACK/NACK concerning another version, or the version copy should also be transmitted.

To further clarify the scenario, for the receiver to know which data was received, ACK of each transmitted segment, or ACK of full version of the data block is needed. Also in the case where two copies of a segment are transmitted, it may suffice that only one of the transmitted copies are received.

In an embodiment, the first network node of FIG. 2 determines that the data block needs a retransmission and terminates the current transmission process. The first network node may then proceed on, for example, generating a new transmission process to transmit the data of the data block to the receiver. This may happen after and/or before performing the retransmission of block 230 of FIG. 2.

In an embodiment, the network element 102 terminates current uplink HARQ process of the data block. That is, the network element 102 may determine that the first transfer of the data block by the terminal device 110 to the network element 102 has failed, and terminates the current HARQ process. The network element 102 may then indicate to the terminal device 110 that the retransmission of the data should be performed in smaller data blocks for more robust data transfer.

In an embodiment, the terminal device 110 skips receiving the second version 644, if it has successfully received the first version 642. Example of this may be shown in FIG. 6G, wherein the terminal device 110 may receive the first version 642, and thus skip receiving the second version 644 and/or any further versions of the same data block (e.g. if three versions of the data block are transmitted). In an embodiment, the terminal device 110 transmits an ACK for the second version 644 even though it has actually skipped receiving the second version 644. However, as the first version 642 was received, transmitting a second ACK may improve the reliability of the data block transfer. In an embodiment, the terminal device 110 does not transmit the second ACK if it has skipped receiving the second version 644. In an embodiment, the network (e.g. the network element 102) configures the terminal device 110 to transmit or not to transmit the second ACK. Thus, the network may indicate to the terminal device 110 whether it should transmit ACK(s) for data packet version(s) that were actually not received by the terminal device 110 (i.e. the receiving of said data packet version(s) were deliberately skipped due to the receiving the earlier version successfully).

Let us now look closer on how the different criterions of step 220 and/or step 330 may be met. Concerning the first criterion that may be for the data block size, it may relate to an explicit data amount threshold, wherein the transmitter (such as the network element 102 and/or the terminal device 110) and/or receiver determines whether the size of the data block is larger and/or as large as the threshold. In an embodiment, the threshold for the data block size is dynamically adjustable based on data rate. For example, for one data rate there may be a different data block size threshold than for some other data rate. The data rate may be vary between systems and/or also within a system in different use cases. Thus, the determining whether the size of said data block meets the first criterion may comprise determining whether the size of the data block is over or at least as large as a data block size threshold (e.g. first threshold). And as explained, the data block size threshold may be different for different data rates. In an embodiment, the data block size threshold is 50 bytes. Thus, for example, data blocks which are over 50 bytes large and/or at least 50 bytes large may meet the first criterion. For example, the data block which meets the first criterion may be from 50 bytes to 60 Kbytes large. However, these need to be understood as non-limiting examples.

In an embodiment, the data block size threshold is 0 bytes. This may mean that in the radio system, at least for some devices, it may be configured that all of the data blocks are transmitted according to the first set of rules. In such case the situation may not require the initial transmission (e.g. transmission of block 402). For example, for MTC devices it may be beneficial that they transmit their data successfully in first try, and thus it may be beneficial to do the transmitting according to the first set of rules. In MTC type communication, where devices transmit occasionally data and sleep for relatively long time, it may be beneficial to configure the at least one criterion (e.g. the first criterion and/or the second criterion) such that the transmitting is always performed according to first set of rules. This may allow the devices to transmit the data quickly and enter sleep mode to conserve energy. It needs to be understood that the data block size as a criterion may be just one example, and thus also other triggers may be used. For example, the network could configure the MTC devices to always utilize the transmitting according to first set of rules without the need to have determination whether the at least one criterion is met.

Figure 7A:
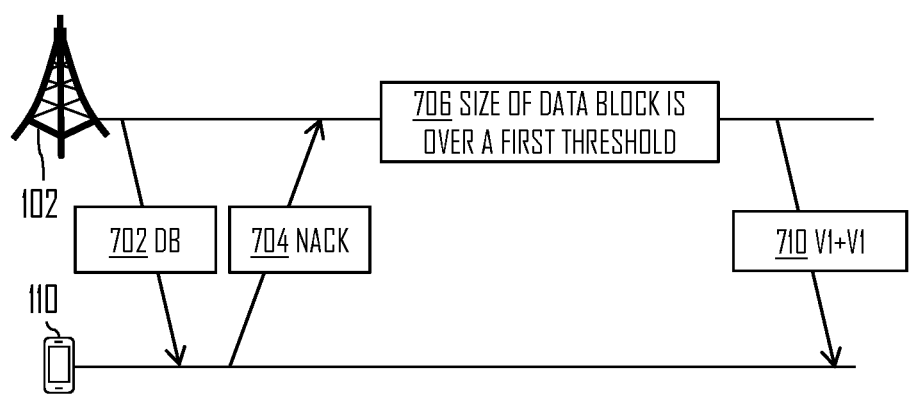
FIGS. 7A to 7B illustrate some embodiments.

An example of the first threshold or the first criterion may be shown in FIG. 7A, wherein the network element 102 may first transmit a data block to the terminal device 110 (block 702). The terminal device 110 may indicate to the network element 102 that it has not successfully received the data block (block 704). The network element 102 may then determine that the size of the data block is over the first threshold (i.e. the data block size threshold) (block 706), and perform the retransmission according to the first set of rules (block 710). In this particular example, the network element 102 may transmit redundancy version V1 of the data block, and a copy of it in the same retransmission message.

Figure 7B:
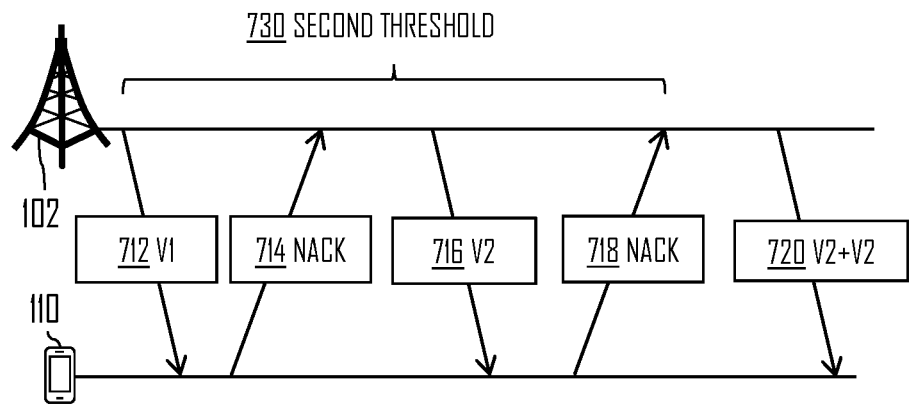

Coming back to the second criterion, determining whether the latency requirements of said data block meet the second criterion may be, for example, determined using a second threshold 730 shown in FIG. 7B. For example, the second threshold may be an explicit time constraint, a maximum number of retransmissions, and/or consecutive HARQ round trip time. In the example of FIG. 7B, the second threshold 730 may be two retransmissions meaning that for the third retransmission, the network element 102 may utilize the first set of rules (block 720) as the second criterion may be met. It needs to be reminded, that the determination whether the at least one criterion is met may comprise determining whether one and/or both of the criterions are met. The second criterion may mean that for a certain data block, the latency may need to be under some value. There may be different latency requirements for different data block (e.g. different data types). For some data blocks, the latency requirement may be less strict than for others. In an embodiment, the data type may affect the latency requirement as some services may require shorter latency (e.g. the explicit time constraint is shorter). For such type of data, the second threshold 730 may be more easily met.

For example, in the example of FIG. 7B, the network element 102 may transmit first version of the data block (e.g. full data block) in block 712. In block 714, the network element 102 may receive NACK from the terminal device 110 to the first version. Then a second version may be transmitted (block 716). Similarly, NACK to the second version may be received (block 718). In block 720, the at least one criterion may be met, and thus the retransmission may comprise, for example, the second version and a copy of the second version.

Figure 8:
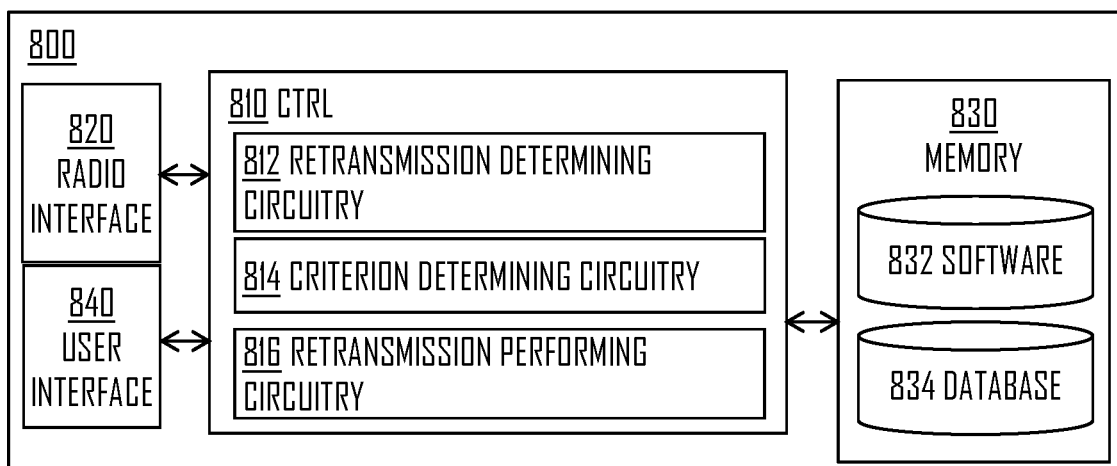
FIGS. 8 to 9 illustrate block diagrams of apparatuses according to some embodiments of the invention.
Figure 9:
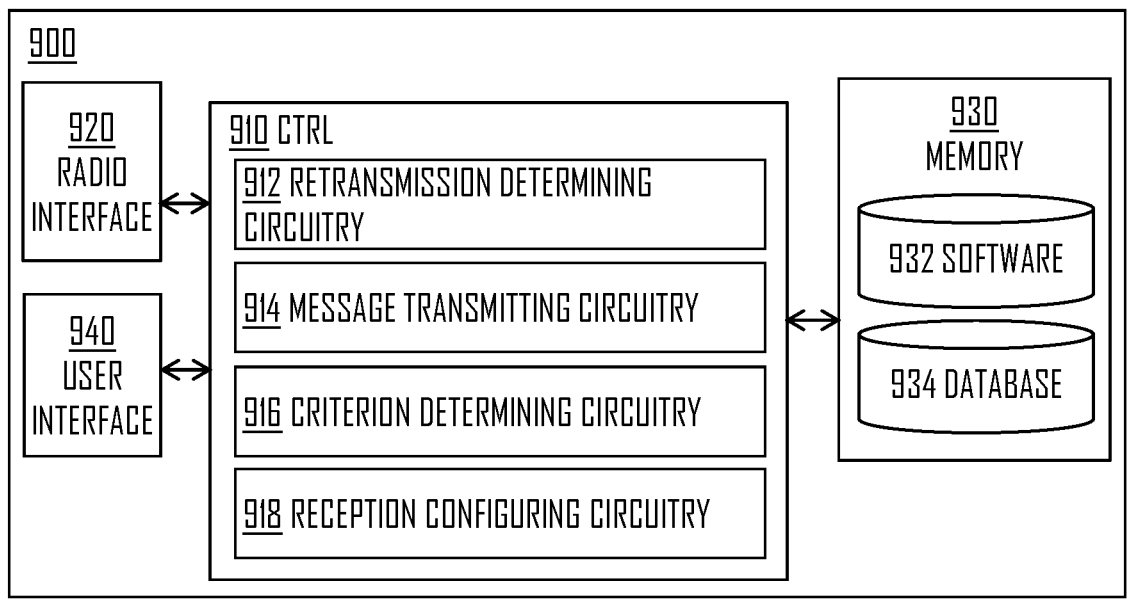

FIGS. 8 to 9 provide apparatuses 800, 900 comprising a control circuitry (CTRL) 810, 910, such as at least one processor, and at least one memory 830, 930 including a computer program code (software) 832, 932, wherein the at least one memory and the computer program code (software) 832, 932, are configured, with the at least one processor, to cause the respective apparatus 800, 900 to carry out any one of the embodiments of FIGS. 1 to 7B, or operations thereof.

Referring to FIGS. 8 to 9, the memory 830, 930, may be implemented using any suitable data storage technology, such as semiconductor based memory devices, flash memory, magnetic memory devices and systems, optical memory devices and systems, fixed memory and removable memory. The memory 830, 930 may comprise a database 834, 934 for storing data.

The apparatuses 800, 900 may further comprise radio interface (TRX) 820, 920 comprising hardware and/or software for realizing communication connectivity according to one or more communication protocols. The TRX may provide the apparatus with communication capabilities to access the radio access network, for example. The TRX may comprise standard well-known components such as an amplifier, filter, frequency-converter, (de)modulator, and encoder/decoder circuitries and one or more antennas. For example, the TRX may enable communication between the terminal device 110 and the network element 102. Further, the TRX may provide access to the X2-interface 190 by the network element 102, for example.

The apparatuses 800, 900 may comprise user interface 840, 940 comprising, for example, at least one keypad, a microphone, a touch display, a display, a speaker, etc. The user interface 840, 940 may be used to control the respective apparatus by a user of the apparatus 800, 900. For example, a network element may be configured using the user interface comprised in said network element. Naturally, a terminal device may comprise a user interface.

In an embodiment, the apparatus 800 may be or be comprised in a base station (also called a base transceiver station, a Node B, a radio network controller, or an evolved Node B, for example). The apparatus 800 may be the network element 102 and/or the local area access node 112, for example. Further, the apparatus 800 may be the first network node performing the steps of FIG. 2. In an embodiment, the apparatus 800 is comprised in the network element 102. In an embodiment, the apparatus 800 is and/or is comprised in the terminal device 110.

Referring to FIG. 8, the control circuitry 810 may comprise a retransmission determining circuitry 812 configured to determine that a transfer of a data block to a second network node needs a retransmission; a criterion determining circuitry 814 configured to determine whether at least one criterion for a size and/or latency requirements of said data block is met; and a retransmission performing circuitry 816 configured to, as a response to determining that the at least one criterion is met, perform the retransmission according to a first set of rules, otherwise perform the retransmission according to a second set of rules.

In an embodiment, the apparatus 900 may be or be comprised in a terminal device, such as a mobile phone or cellular phone, for example. The apparatus 900 may be the at least one terminal device 110, 120, 130, 140, for example. In an embodiment, the apparatus 900 is the second network node performing the steps of FIG. 3. In an embodiment, the apparatus 900 is comprised in the at least one terminal device 110, 120, 130, 140. In an embodiment, the apparatus 900 is and/or is comprised in the network element 102.

Referring to FIG. 9, the control circuitry 910 may comprise a retransmission determining circuitry 912 configured to determine that a transfer of a data block from a first network node of the cellular communication network to a second network node needs a retransmission; a message transmitting circuitry 914 configured to transmit a message to the first network node, wherein said message indicates the need for the retransmission; a criterion determining circuitry 916 configured to determine whether at least one criterion for a size and/or latency requirements of said data block is met; and a reception configuring circuitry 918 configured to configure reception of the retransmission according to a first set of rules if the at least one criterion is met, otherwise configure reception of the retransmission according to a second set of rules.

Figure 10:
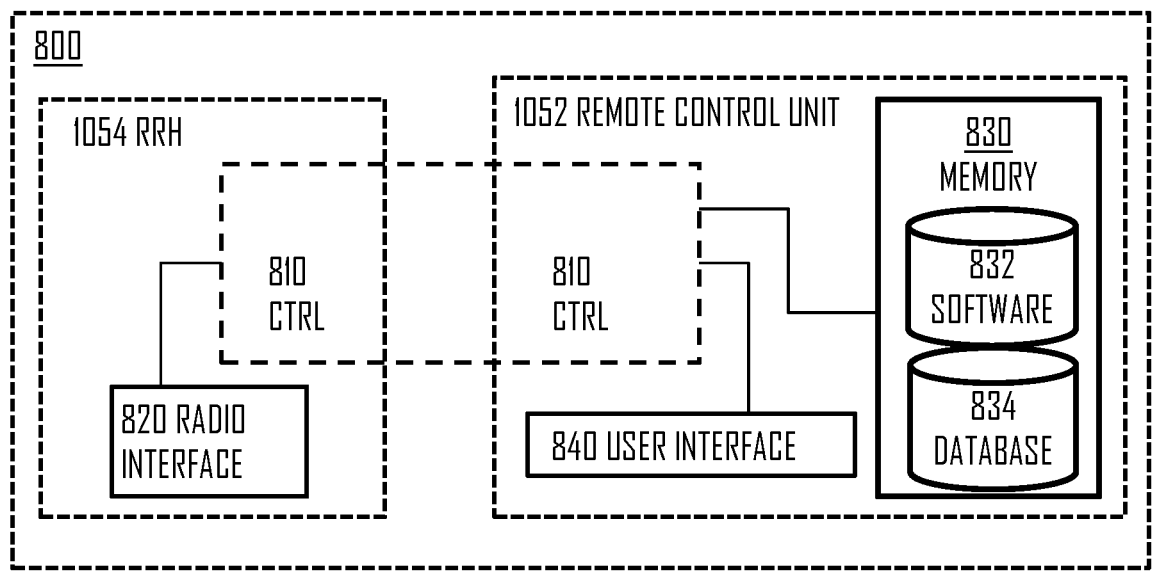
FIG. 10 illustrates an embodiment.

In an embodiment, as shown in FIG. 10, at least some of the functionalities of the apparatus 800 may be shared between two physically separate devices, forming one operational entity. Therefore, the apparatus 800 may be seen to depict the operational entity comprising one or more physically separate devices for executing at least some of the described processes. Thus, the apparatus 800 utilizing such shared architecture (e.g. as shown in FIG. 10), may comprise a remote control unit (RCU) 1052, such as a host computer or a server computer, operatively coupled (e.g. via a wireless or wired network) to a remote radio head (RRH) 1054 located in the base station. In an embodiment, at least some of the described processes may be performed by the RCU 1052. In an embodiment, the execution of at least some of the described processes may be shared among the RRH 1054 and the RCU 1052.

In an embodiment, the RCU 1052 may generate a virtual network through which the RCU 1052 communicates with the RRH 1054. In general, virtual networking may involve a process of combining hardware and software network resources and network functionality into a single, software-based administrative entity, a virtual network. Network virtualization may involve platform virtualization, often combined with resource virtualization. Network virtualization may be categorized as external virtual networking which combines many networks, or parts of networks, into the server computer or the host computer (i.e. to the RCU). External network virtualization is targeted to optimized network sharing. Another category is internal virtual networking which provides network-like functionality to the software containers on a single system. Virtual networking may also be used for testing the terminal device.

In an embodiment, the virtual network may provide flexible distribution of operations between the RRH and the RCU. In practice, any digital signal processing task may be performed in either the RRH or the RCU and the boundary where the responsibility is shifted between the RRH and the RCU may be selected according to implementation.

Similarly, as the apparatus 800 in FIG. 10, the apparatus 900 may be shared with two or more physical entities.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In an embodiment, at least some of the processes described in connection with FIGS. 1 to 7B may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIGS. 1 to 7B or operations thereof.

According to yet another embodiment, the apparatus carrying out the embodiments comprises a circuitry including at least one processor and at least one memory including computer program code. When activated, the circuitry causes the apparatus to perform at least some of the functionalities according to any one of the embodiments of FIGS. 1 to 7B, or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described in connection with FIGS. 1 to 7B may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art. In an embodiment, a computer-readable medium comprises said computer program.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A method comprising:
   determining, by a first network node of a cellular communication network, that a transfer of a data block to a second network node of the cellular communication network needs a retransmission; determining whether at least one criterion for a latency requirement of said data block is met, wherein the at least one criterion for the latency requirement is met when a current latency of the data block is above a latency threshold; and
   as a response to determining that the at least one criterion is met, performing the retransmission according to a first set of rules,
   otherwise performing the retransmission according to a second set of rules, wherein performing the retransmission according to the first set of rules provides a higher probability of a successful retransmission than performing the retransmission according to the second set of rules; and
   wherein a message of the retransmission according to the first set of rules comprises more information of the data block than a message of the retransmission according to the second set of rules.

2. The method of claim 1, wherein a message of the retransmission according to the first set of rules comprises at least one version of the data block, and at least one segment of the same or different version of the data block.

3. The method of claim 1, wherein the retransmission according to the second set of rules comprises transmitting only one version of said data block.

4. The method of claim 1, further comprising:
   transmitting a control message to the second network node, wherein the control message comprises indication of the at least one criterion in order to enable the second network node to expect the retransmission according to at least one of the first set of rules, the second set of rules.

5. The method of claim 1 wherein:
the performing the retransmission according to the second set of rules comprises transmitting one version of the data block; and
the performing the retransmission according to the first set of rules comprises transmitting more than one version of the data block.

6. The method claim 5 wherein the transmitting more than one version of the data block comprises performing at least one of the following:
transmitting a same redundancy version of the data block twice;
transmitting a first redundancy version of the data block and a second redundancy version of the data block; or
transmitting a first redundancy version, and only a segment or portion of the first redundancy version or other redundancy version of the data block.

7. The method of claim 1:
wherein the determining that a transfer of a data block needs a retransmission comprises determining, by the first network node, that a transfer of a data block to a second network node of the cellular communication network needs a retransmission based at least on a failed initial transmission of the data block;
wherein the at least one criterion for the latency requirement of the data block is met when a current latency of the data block, since the failed initial transmission of the data block, is above a latency threshold.

8. An apparatus comprising at least one processor and at least one memory including a computer program code, wherein the at least one memory and the computer program code are configured, with the at least one processor, to at least cause a first network node of a cellular communication network, to:
determine that a transfer of a data block to a second network node of the cellular communication network needs a retransmission;
determine whether at least one criterion for a latency requirement of said data block is met, wherein the at least one criterion for the latency requirement is met when a current latency of the data block is above a latency threshold; and
as a response to the determining that the at least one criterion is met, perform the retransmission according to a first set of rules,
otherwise perform the retransmission according to a second set of rules, wherein performing the retransmission according to the first set of rules provides a higher probability of a successful retransmission than performing the retransmission according to the second set of rules; and
wherein a message of the retransmission according to the first set of rules comprises more information of the data block than a message of the retransmission according to the second set of rules.

9. The apparatus of claim 8, wherein a message of the retransmission according to the first set of rules comprises a version of said data block, and either a copy of said version or another version of said data block.

10. The apparatus of claim 8, wherein the at least one memory and the computer program code are configured, with the at least one processor, to cause the first network node further to:
divide said data block into a plurality of segments, wherein the message of the retransmission according to the first set of rules comprises the plurality of segments.

11. The apparatus of claim 8, wherein a message of the retransmission according to the first set of rules comprises at least one version of the data block, and at least one segment of the same or different version of the data block.

12. The apparatus of claim 8, wherein the retransmission according to the first set of rules is performed within a transmission time interval, or within said transmission time interval and at least one other transmission time interval being subsequent to said transmission time interval.

13. The apparatus of claim 12, wherein the subsequent at least one other transmission time interval is non-consecutive to said transmission time interval and within the latency requirement of said data block.

14. The apparatus of claim 8, wherein the retransmission according to the second set of rules comprises transmitting only one version of said data block.

15. The apparatus of claim 8, wherein the at least one memory and the computer program code are configured, with the at least one processor, to cause the first network node further to:
transmit a control message to the second network node, wherein the control message comprises indication of the at least one criterion in order to enable the second network node to expect the retransmission according to at least one of the first set of rules or the second set of rules.

16. The apparatus of claim 8 wherein the first network node is a terminal device, and wherein the retransmission is an uplink retransmission.

17. The apparatus of claim 16, wherein the at least one memory and the computer program code are configured, with the at least one processor, to cause the first network node further to:
acquire the at least one criterion from the cellular communication network.

18. The apparatus of claim 16, wherein the at least one memory and the computer program code are configured, with the at least one processor, to cause the first network node further to:
schedule radio resources for the uplink retransmission according to the first set of rules; and
perform the uplink retransmission using the scheduled radio resources.

19. The apparatus of claim 16, wherein the at least one memory and the computer program code are configured, with the at least one processor, to cause the first network node further to:
acquire from the cellular communication network an indication specifying the content of the message of the retransmission according to the first set of rules.

20. An apparatus comprising at least one processor and at least one memory including a computer program code, wherein the at least one memory and the computer program code are configured, with the at least one processor, to at least cause a second network node of a cellular communication network, to:
determine that a transfer of a data block from a first network node of the cellular communication network to the second network node needs a retransmission;
transmit a message to the first network node, wherein said message indicates the need for the retransmission;
determine whether at least one criterion for a latency requirement of said data block is met, wherein the at least one criterion for the latency requirement is met when a current latency of the data block is above a latency threshold; and if the at least one criterion is met, configure reception of the retransmission according to a first set of rules, otherwise configure reception of the retransmission according to a second set of rules, wherein performing the retransmission according to the first set of rules provides a higher probability of a successful retransmission than performing the retransmission according to the second set of rules; and wherein a message of the retransmission according to the first set of rules comprises more information of the data block than a message of the retransmission according to the second set of rules.

21. The apparatus of claim 20, wherein the at least one memory and the computer program code are configured, with the at least one processor, to cause the second network node further to:

receive a control message from the first network node, wherein the control message comprises indication of the at least one criterion.

22. The apparatus of claim 20, wherein the configuring reception comprises enabling reception of the retransmission over non-consecutive transmission time intervals, and wherein the at least one memory and the computer program code are configured, with the at least one processor, to cause the second network node further to:

transmit, to the first network node, for each of the non-consecutive transmission time intervals an indication of whether the reception during the transmission time interval is successful or not.

\* \* \* \* \*